United States Patent
Krasner et al.

(10) Patent No.: US 11,061,602 B2
(45) Date of Patent: Jul. 13, 2021

(54) SYSTEM AND METHOD FOR EVENT BASED STORAGE MANAGEMENT

(71) Applicant: EMC IP Holding Company LLC, Hopkinton, MA (US)

(72) Inventors: Jonathan I. Krasner, Coventry, RI (US); Daryl Francis Kinney, Hopkinton, MA (US); William Alan Hatstat, Spencer, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 33 days.

(21) Appl. No.: 16/402,199

(22) Filed: May 2, 2019

(65) Prior Publication Data
US 2020/0348847 A1 Nov. 5, 2020

(51) Int. Cl.
G06F 3/06 (2006.01)

(52) U.S. Cl.
CPC ............... *G06F 3/065* (2013.01); *G06F 3/067* (2013.01); *G06F 3/0611* (2013.01); *G06F 3/0659* (2013.01)

(58) Field of Classification Search
CPC ........ G06F 3/065; G06F 3/0659; G06F 3/067; G06F 3/0611
See application file for complete search history.

(56) References Cited

U.S. PATENT DOCUMENTS

| | | | | |
|---|---|---|---|---|
| 7,818,475 | B2 * | 10/2010 | Frey | H04L 41/00 710/33 |
| 8,135,918 | B1 * | 3/2012 | Yueh | G06F 13/28 711/147 |
| 9,026,694 | B1 * | 5/2015 | Davidson | G06F 3/0635 710/38 |
| 9,430,125 | B1 * | 8/2016 | Blitzer | G06F 16/24564 |
| 9,547,591 | B1 | 1/2017 | Natanzon et al. | |
| 2003/0084209 | A1 * | 5/2003 | Chadalapaka | H04L 67/1097 710/5 |
| 2006/0161733 | A1 * | 7/2006 | Beckett | G06F 13/4059 711/118 |
| 2009/0006716 | A1 * | 1/2009 | Lubbers | G06F 3/0683 711/100 |
| 2017/0093760 | A1 * | 3/2017 | Hathorn | H04L 49/3018 |
| 2017/0315726 | A1 * | 11/2017 | White | H04L 49/109 |
| 2018/0302630 | A1 | 10/2018 | Copley et al. | |

* cited by examiner

*Primary Examiner* — Francisco A Grullon
(74) *Attorney, Agent, or Firm* — Chamberlain, Hrdlicka, White, Williams, & Aughtry

(57) ABSTRACT

A storage array for providing data storage services includes persistent storage and a storage array manager. The persistent storage stores data. The storage array manager obtains a request for solicited data using a request queue corresponding to a requesting host; responds, based on the solicited data, to the request using a response queue corresponding to the requesting host; makes a determination that the request implicates multiple hosts; and in response to the determination: distributes unsolicited data, based on the request, to the multiple hosts using the data stored in the persistent storage.

20 Claims, 15 Drawing Sheets

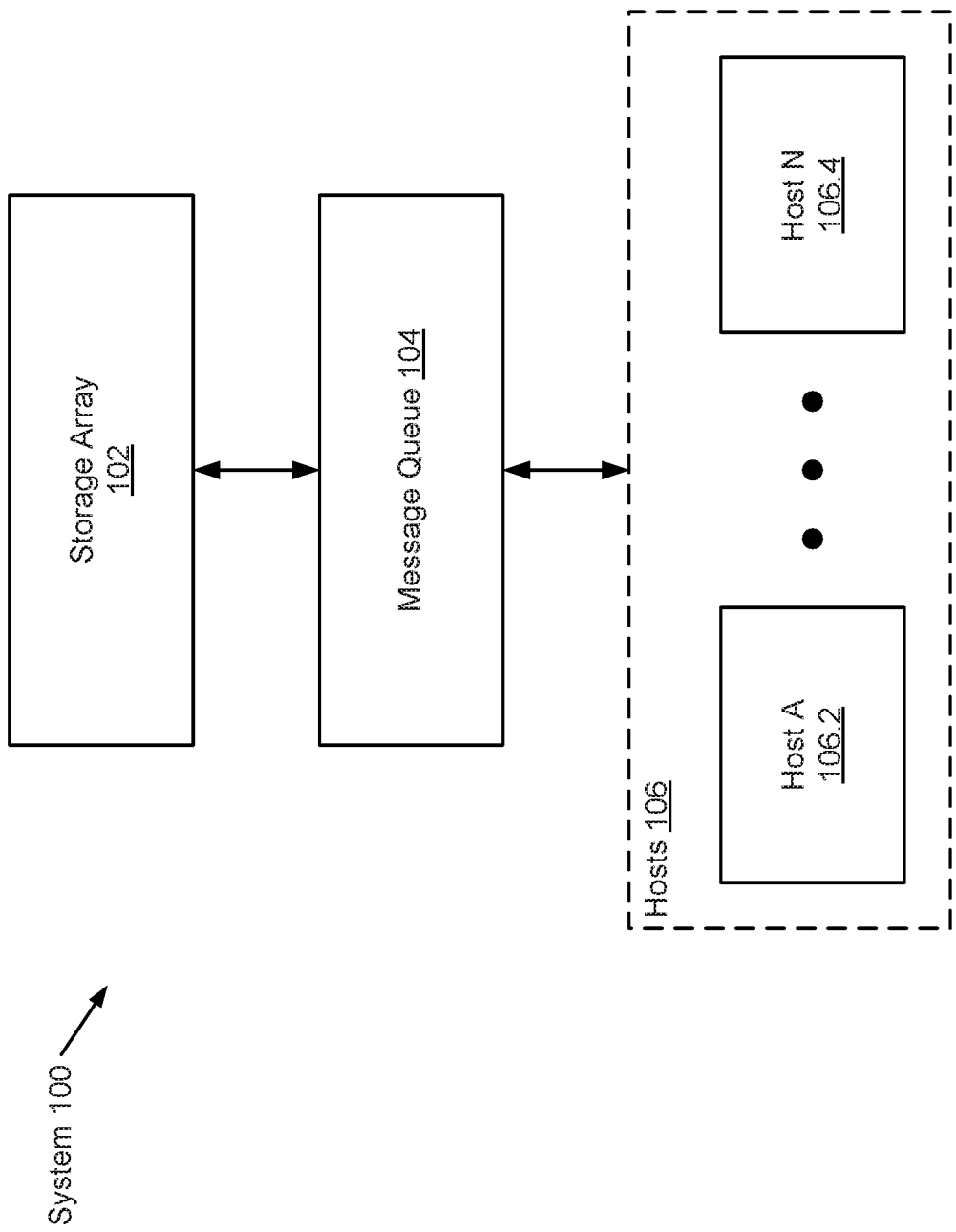

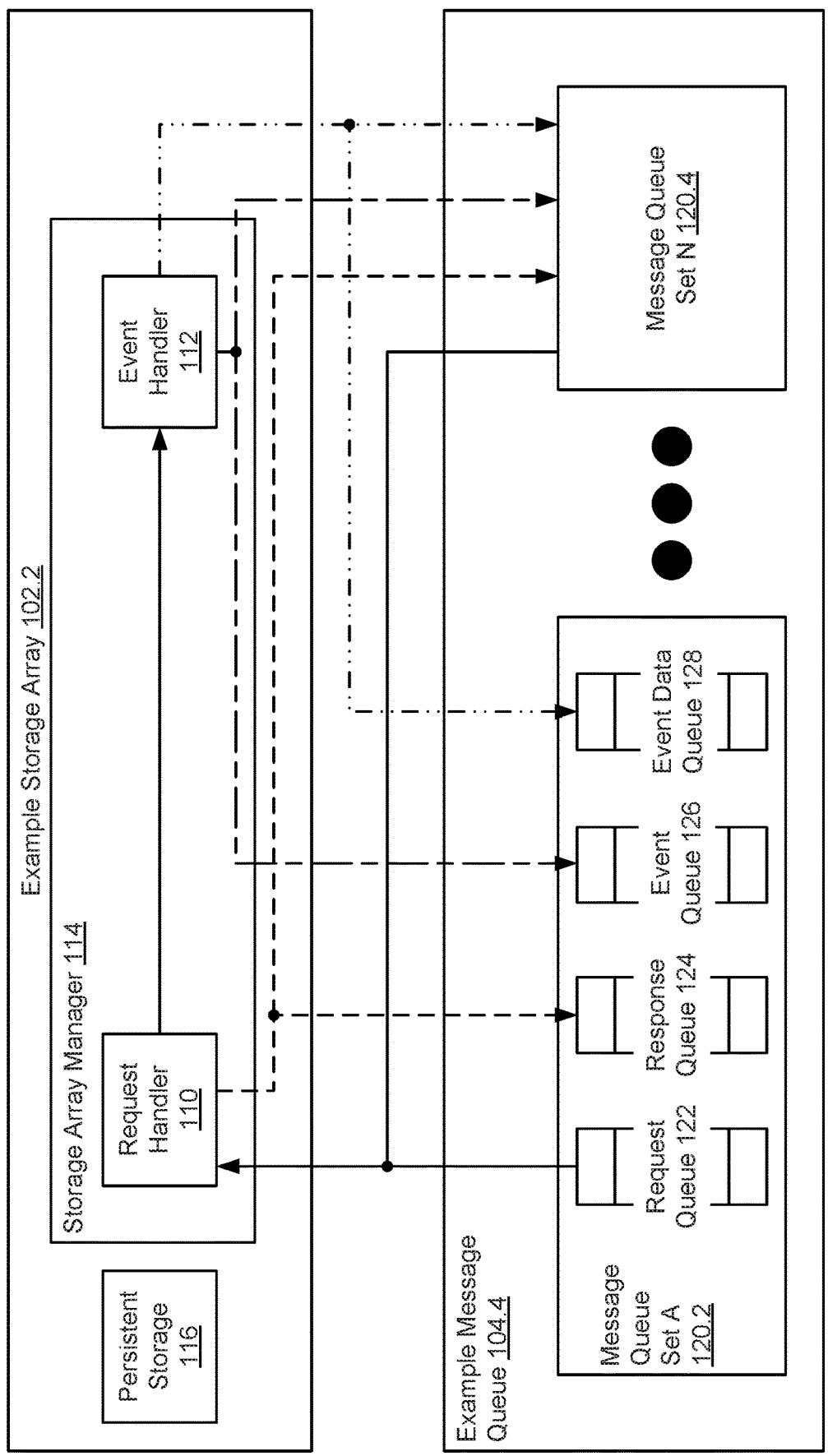
FIG. 1.2

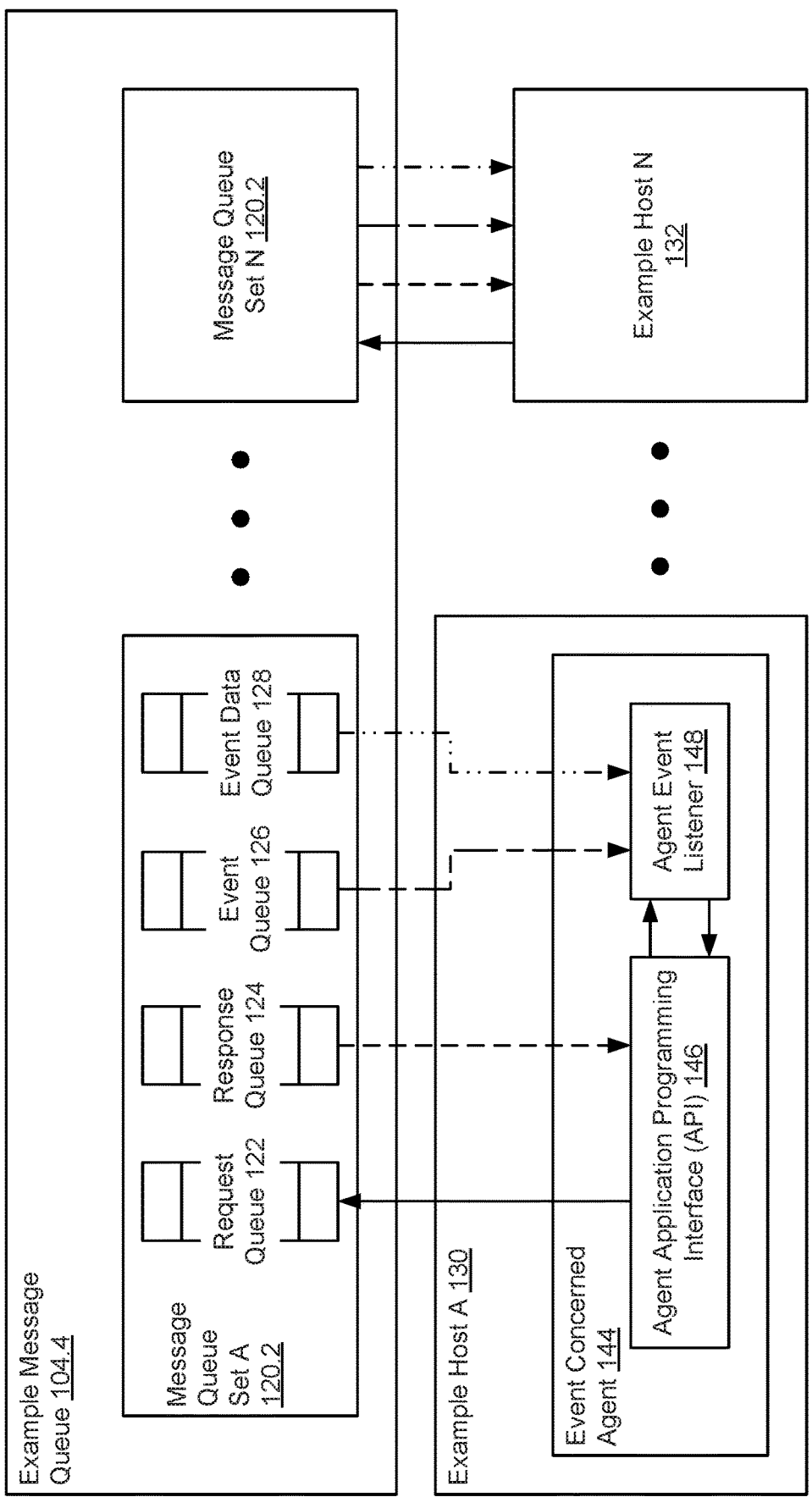
FIG. 1.3

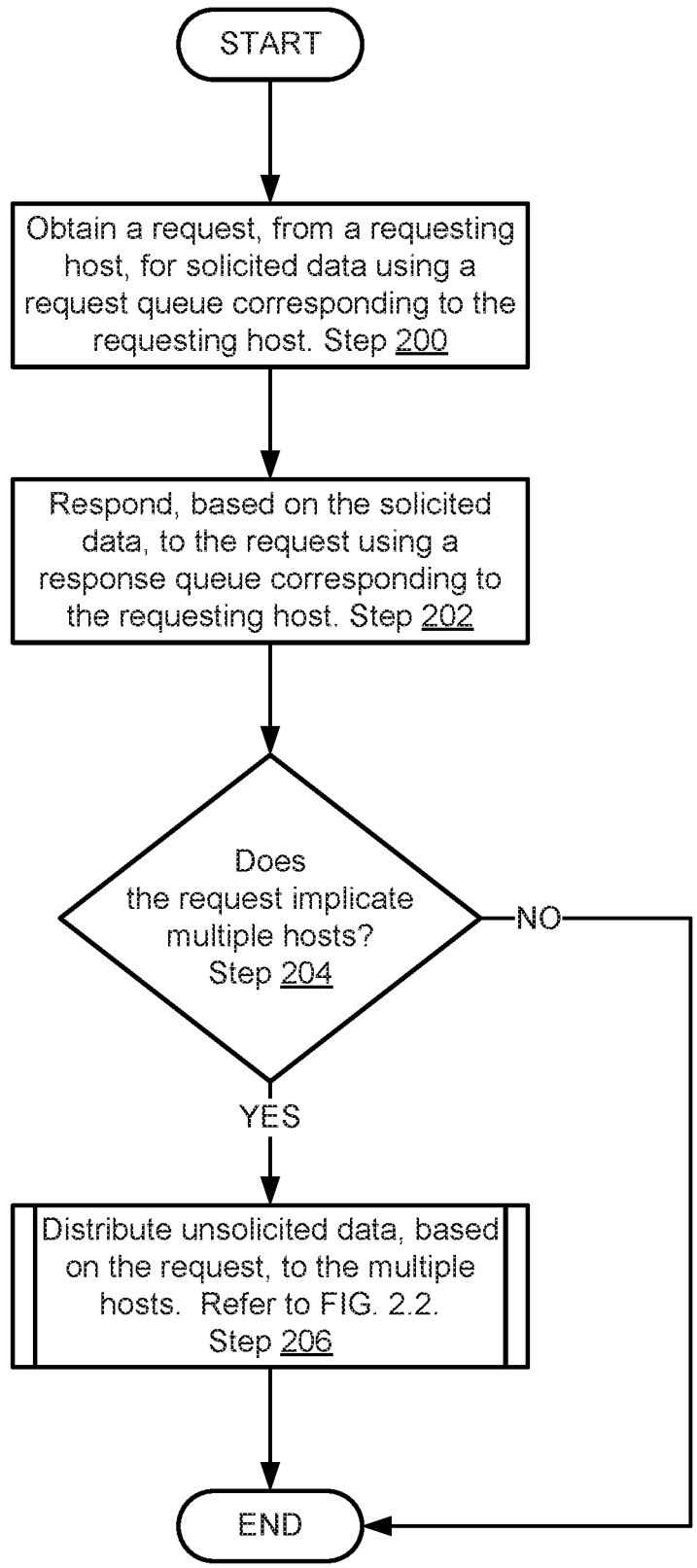
FIG. 2.1

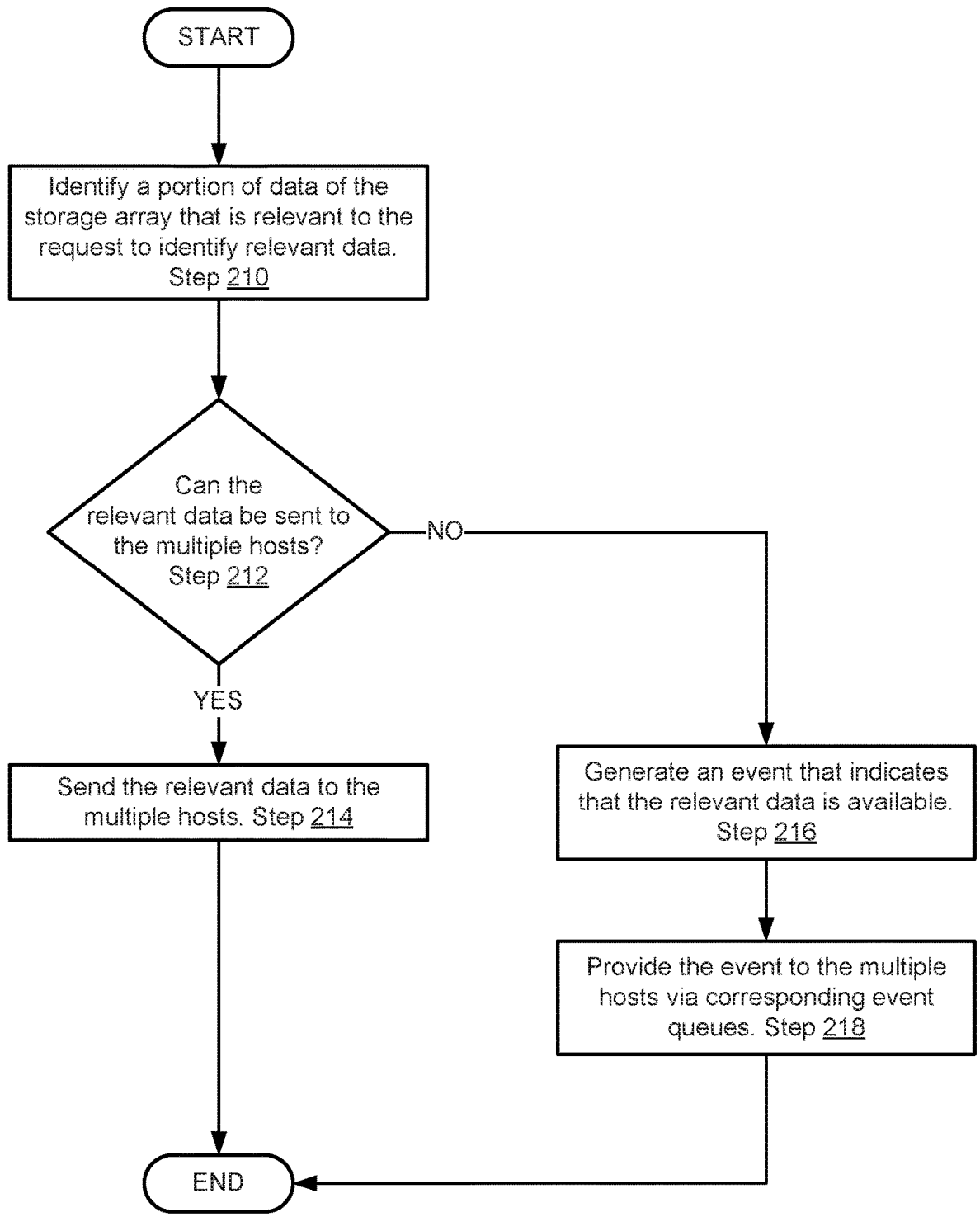
FIG. 2.2

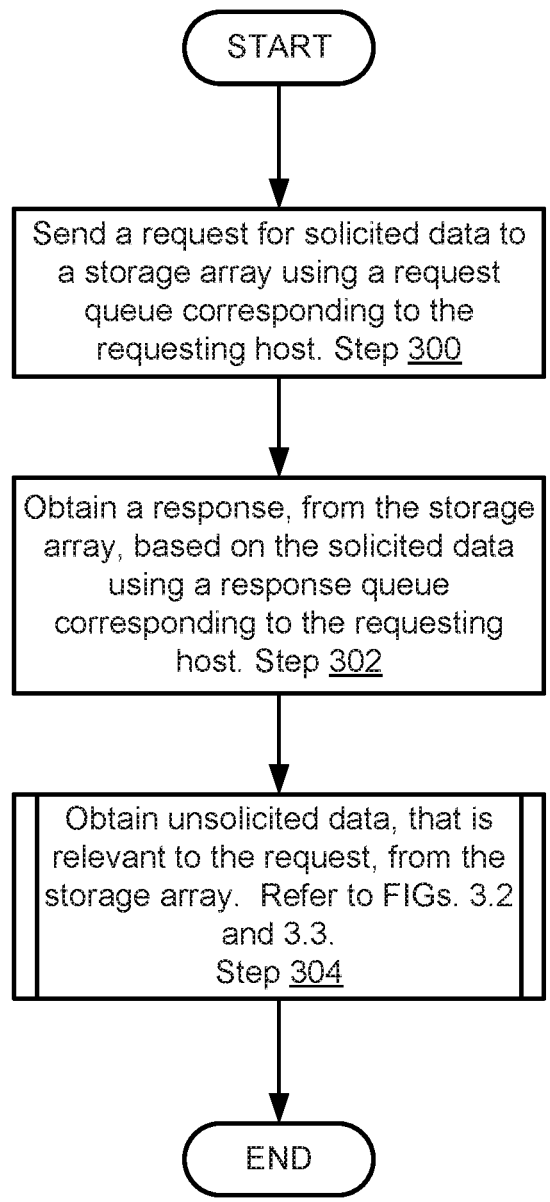
FIG. 3.1

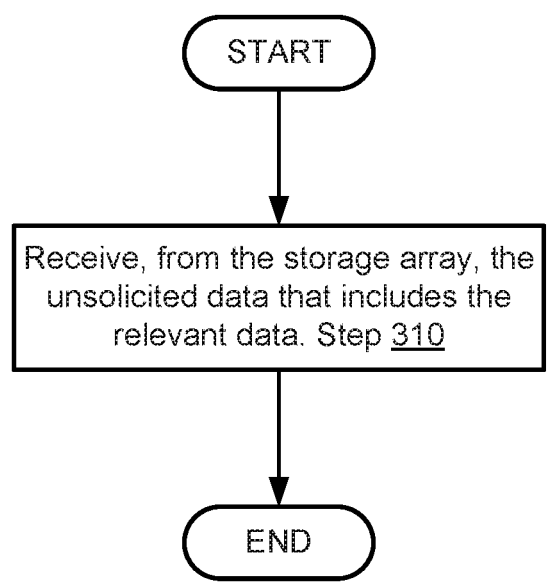
FIG. 3.2

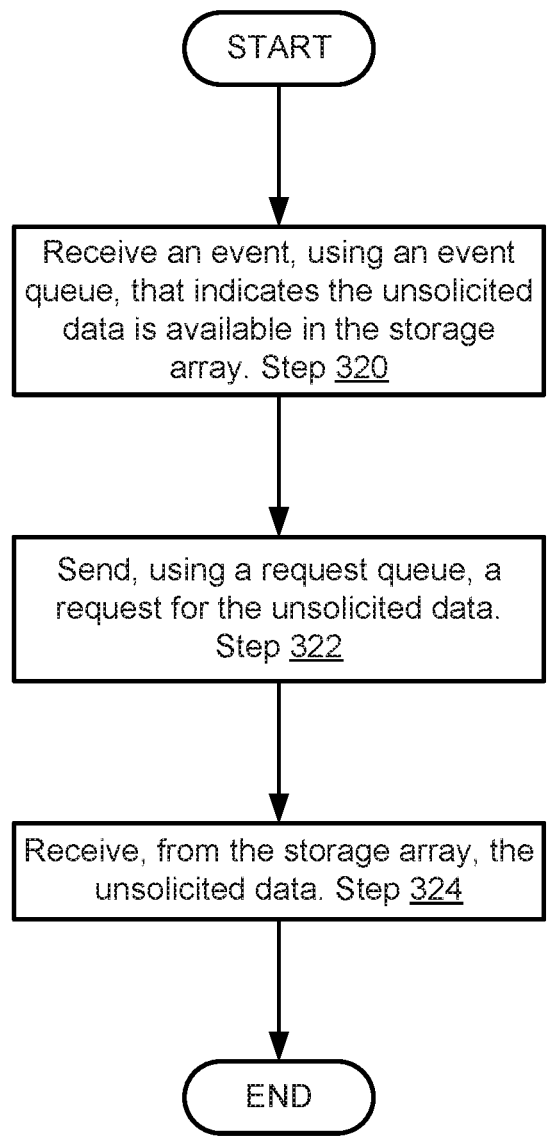
FIG. 3.3

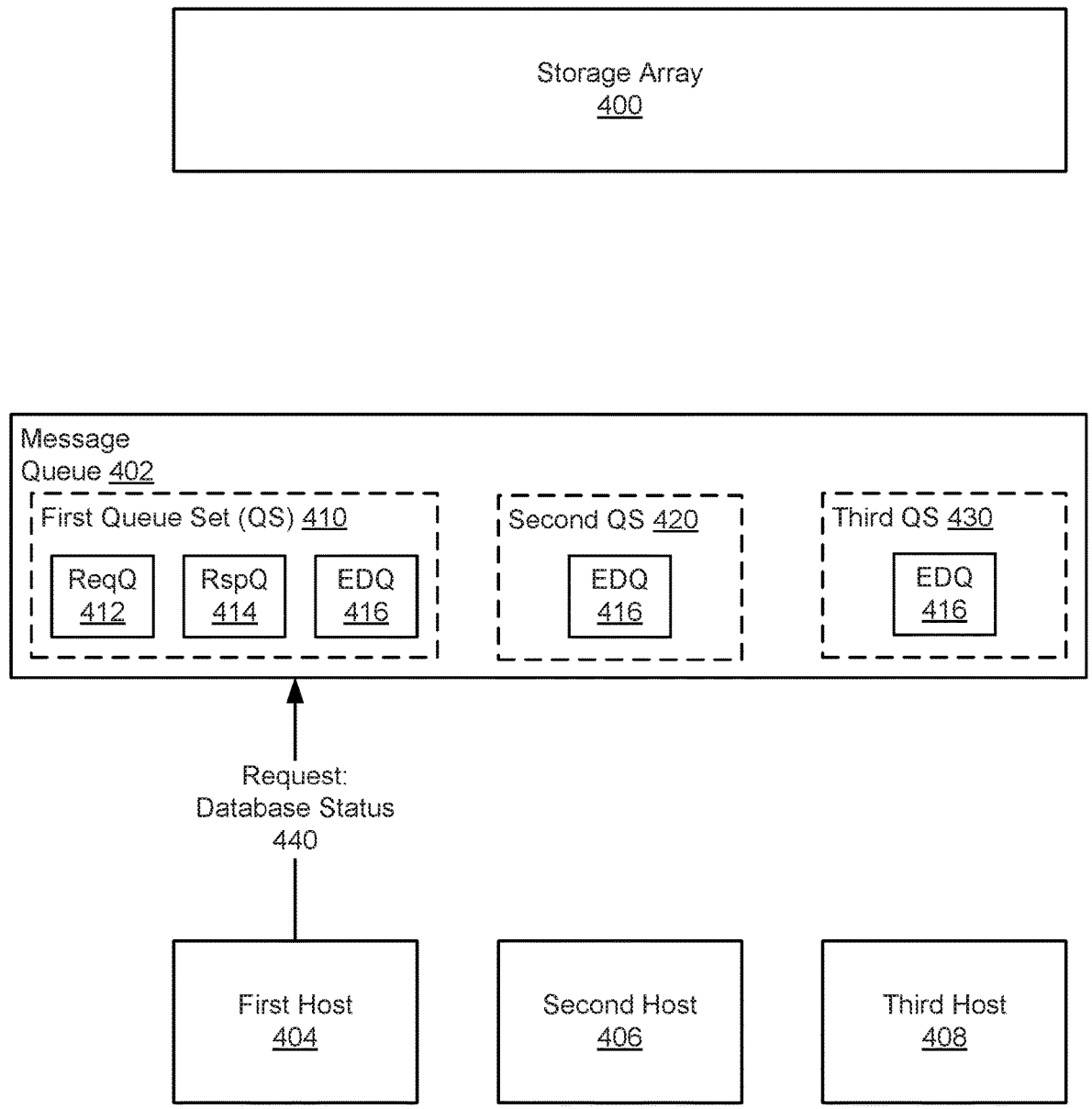
FIG. 4.1

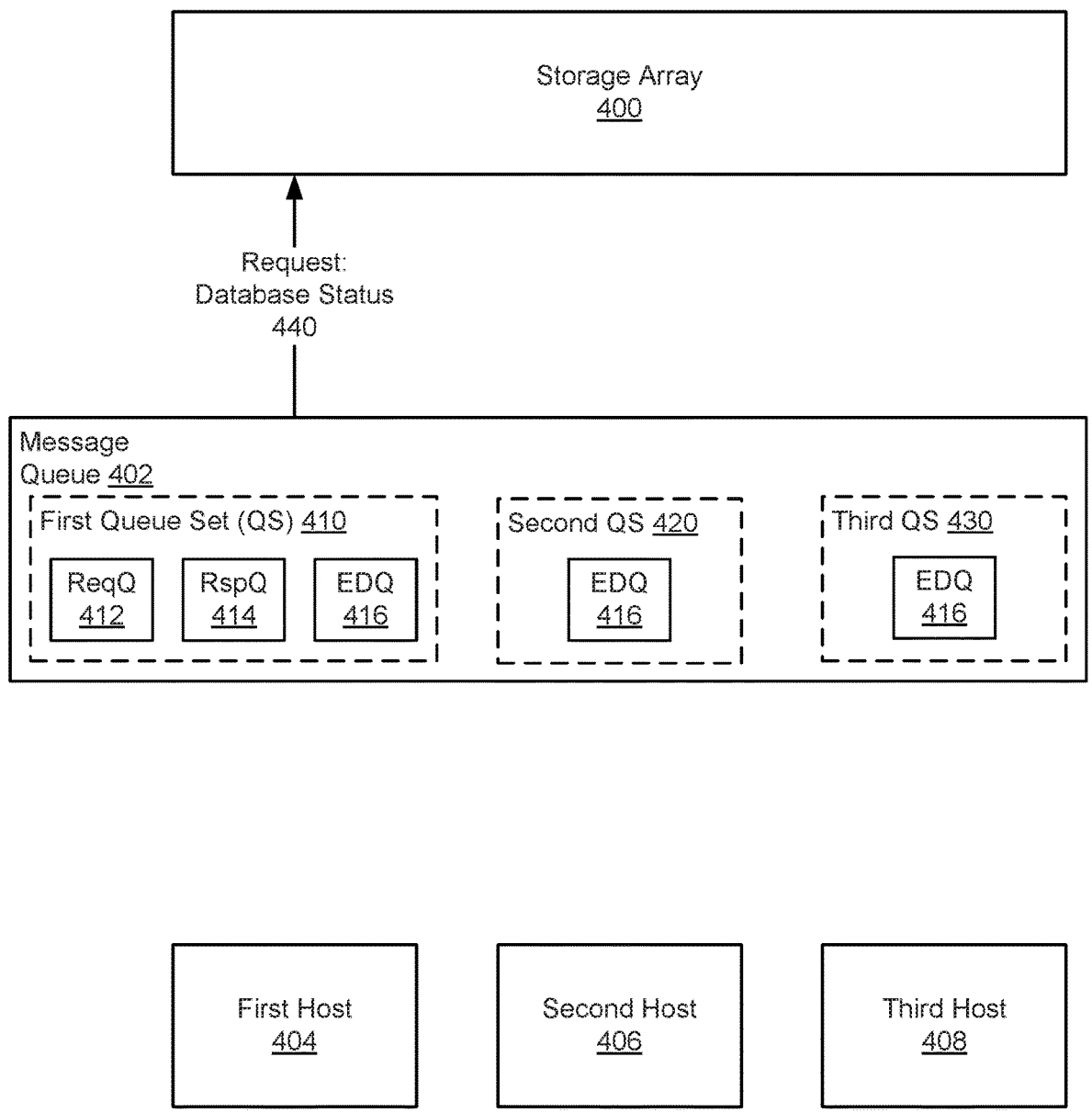
FIG. 4.2

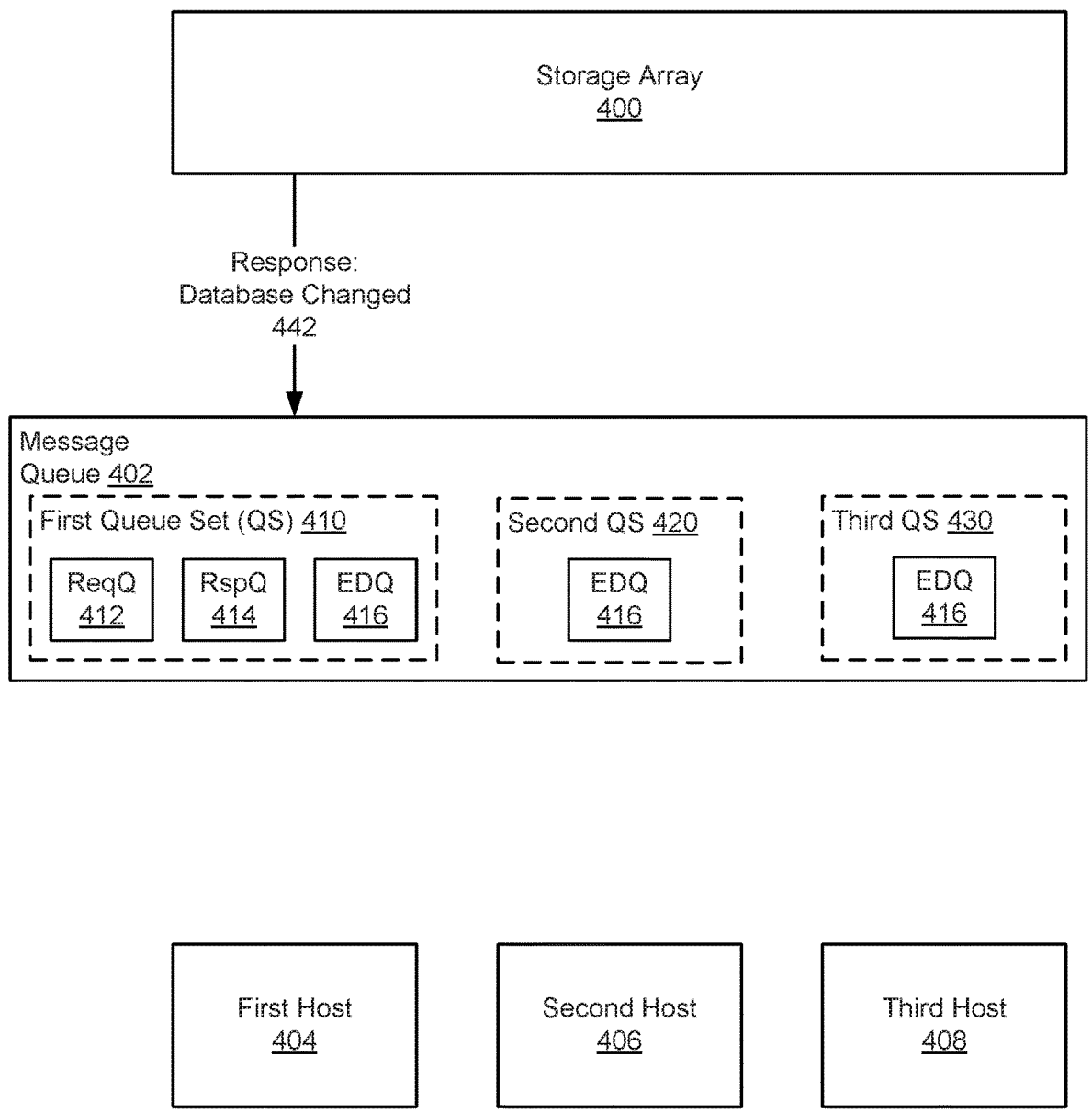
FIG. 4.3

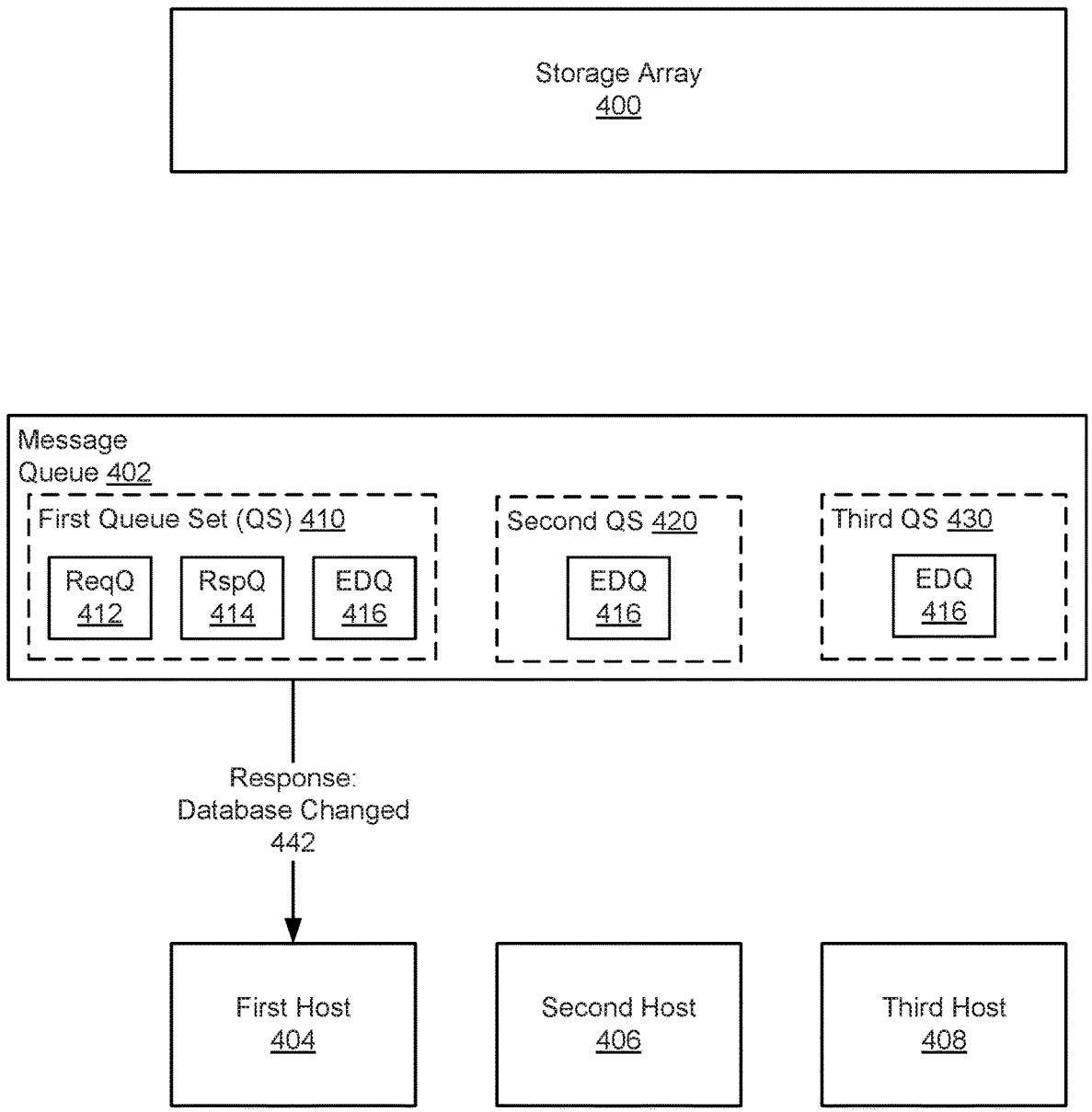
FIG. 4.4

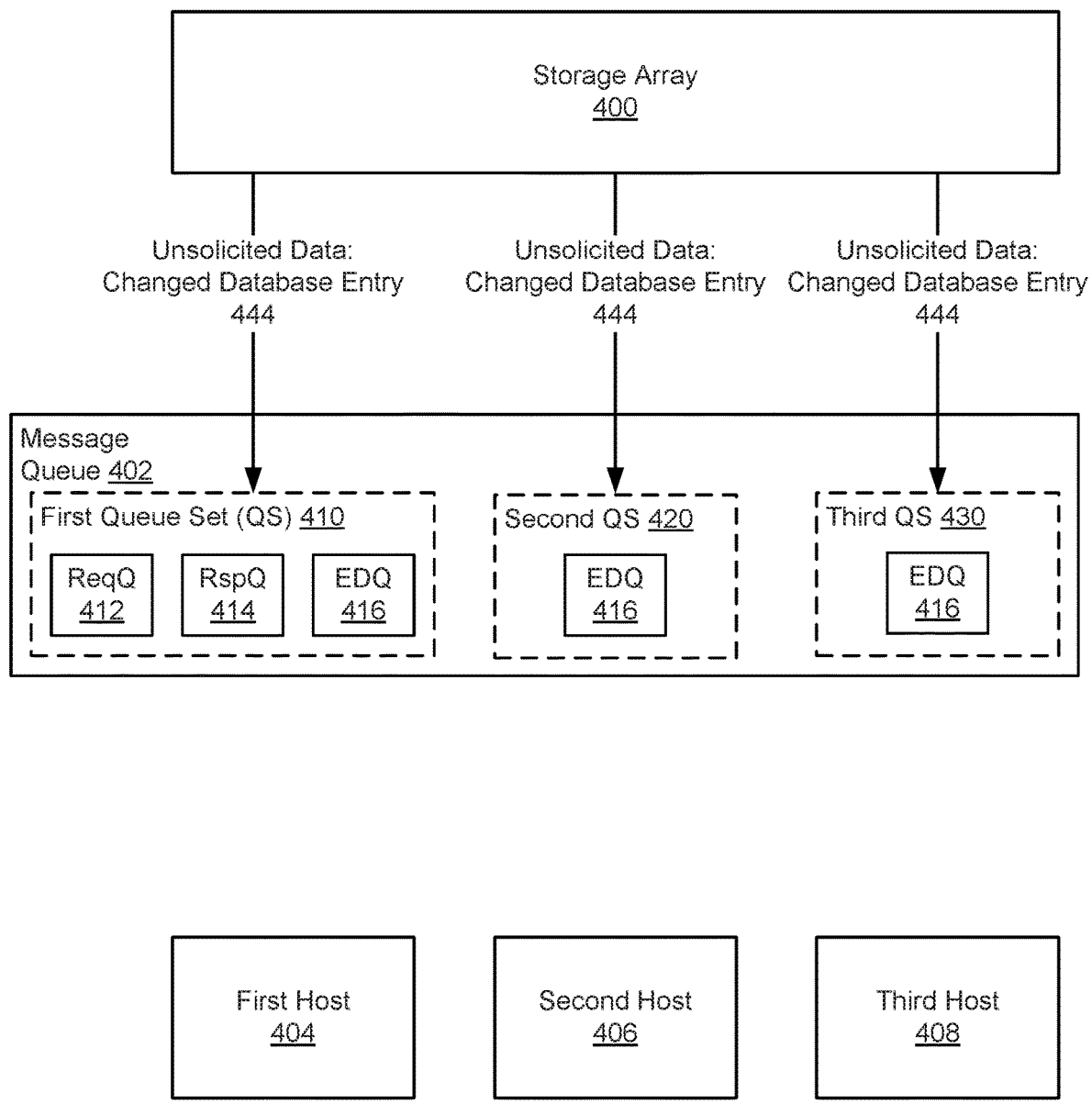
FIG. 4.5

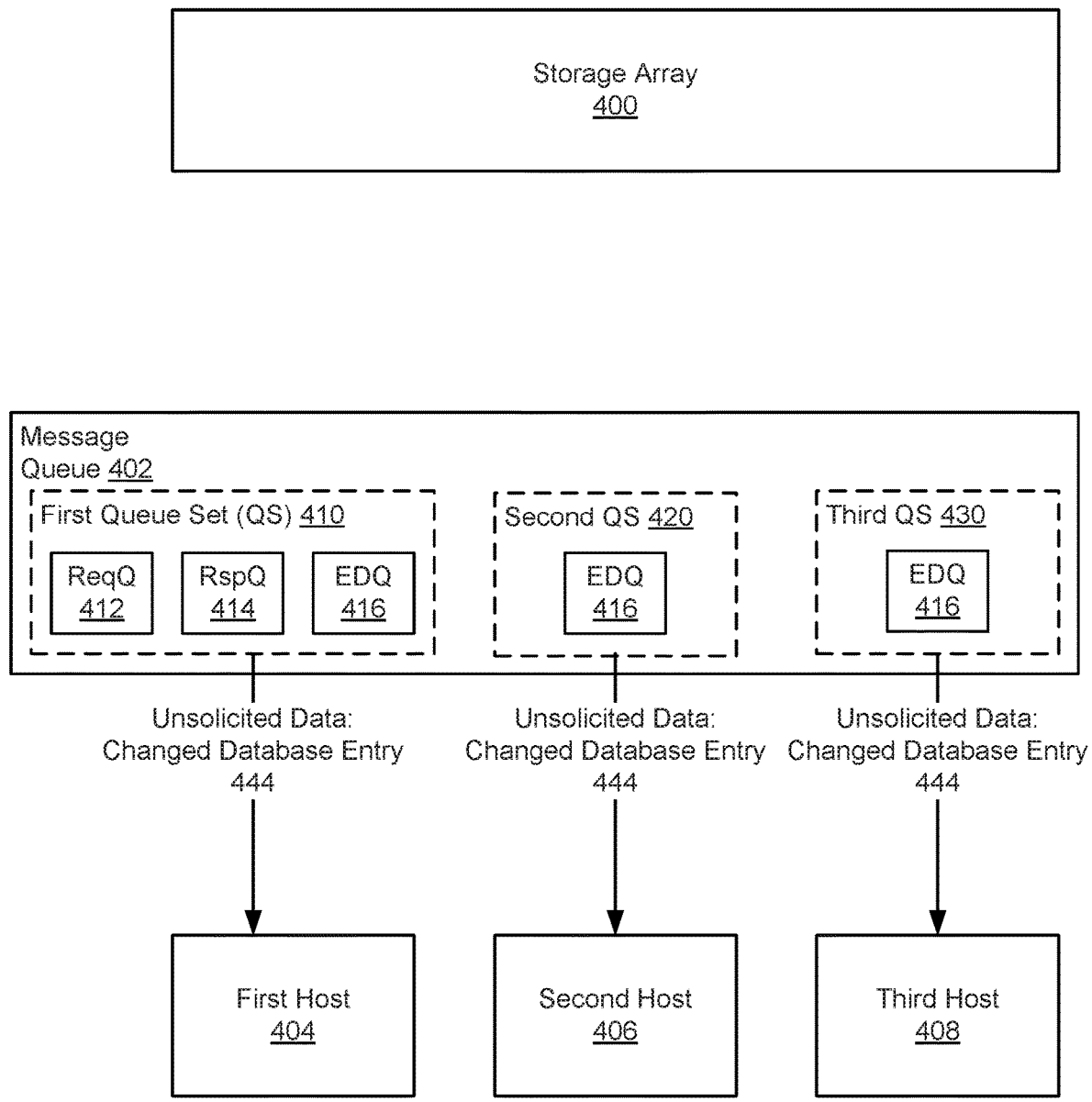
FIG. 4.6

SYSTEM AND METHOD FOR EVENT BASED STORAGE MANAGEMENT

BACKGROUND

Computing devices may generate data during their operation. For example, applications hosted by the computing devices may generate data used by the applications to perform their functions. Such data may be stored in persistent storage of the computing devices.

Data generated by computing devices may also be stored remotely from the computing devices. Such remote storage may be utilized to, for example, redundantly store multiple copies of data for data protection purposes, free storage space by storing the data without utilizing persistent storage of the computing devices, or for other reasons.

SUMMARY

In one aspect, a storage array for providing data storage services in accordance with one or more embodiments of the invention includes persistent storage and a storage array manager. The persistent storage stores data. The storage array manager obtains a request for solicited data using a request queue corresponding to a requesting host; responds, based on the solicited data, to the request using a response queue corresponding to the requesting host; makes a determination that the request implicates multiple hosts; and in response to the determination: distributes unsolicited data, based on the request, to the multiple hosts using the data stored in the persistent storage.

In one aspect, a method for providing data storage services in accordance with one or more embodiments of the invention includes obtaining a request for solicited data using a request queue corresponding to a requesting host; responding, based on the solicited data, to the request using a response queue corresponding to the requesting host; making a determination that the request implicates multiple hosts; and in response to the determination: distributing unsolicited data, based on the request, to the multiple hosts.

In one aspect, a non-transitory computer readable medium in accordance with one or more embodiments of the invention includes computer readable program code, which when executed by a computer processor enables the computer processor to perform a method for providing data storage services. The method includes obtaining a request for solicited data using a request queue corresponding to a requesting host; responding, based on the solicited data, to the request using a response queue corresponding to the requesting host; making a determination that the request implicates multiple hosts; and in response to the determination: distributing unsolicited data, based on the request, to the multiple hosts.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example storage array and example message queue in accordance with one or more embodiments of the invention.

FIG. 1.3 shows a diagram of an example message queue and an example hosts in accordance with one or more embodiments of the invention.

FIG. 2.1 shows a flowchart of a method of providing data management services in accordance with one or more embodiments of the invention.

FIG. 2.2 shows a flowchart of a method of distributing unsolicited data in accordance with one or more embodiments of the invention.

FIG. 3.1 shows a flowchart of a method of obtaining data management services in accordance with one or more embodiments of the invention.

FIG. 3.2 shows a flowchart of a method of obtaining unsolicited data in accordance with one or more embodiments of the invention.

FIG. 3.3 shows a flowchart of a method of obtaining unsolicited data in accordance with one or more embodiments of the invention.

FIGS. 4.1-4.6 show a non-limiting example of a system in accordance with embodiments of the invention.

DETAILED DESCRIPTION

Figure 5:
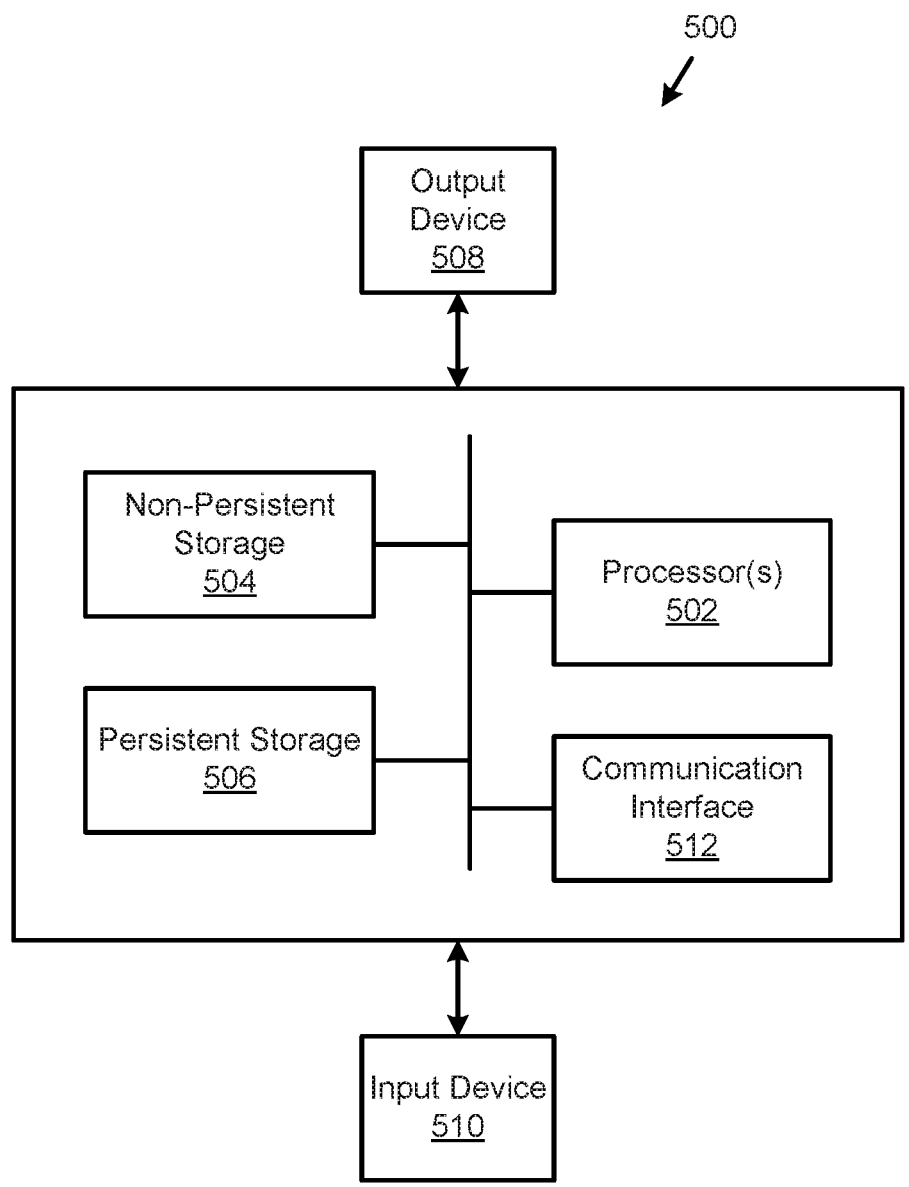
FIG. 5 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for responding to requests for the status of data. Embodiments of the invention may provide a method for responding to the requests for the status of data that makes it less likely that similar requests will be issued in the future. By doing so, the computational resources utilized for responding to such requests may be reduced when compared to systems that respond to such requests in a different manner.

In one or more embodiments of the invention, the system responds to requests for the status of data by providing both solicited data to a requesting entity and unsolicited data to one or more additional entities that did not request the status of the data. The unsolicited data may include information that makes it less likely that the one or more additional entities will solicit the solicited data in the future.

FIG. 1.1 shows an example system (100) in accordance with one or more embodiments of the invention. The example system (100) may include a storage array (102) that provides data storage services. Data storage services may include storing data from clients (not shown) and providing previously stored data. The clients of the storage array (102) may be any number and any types of computing devices.

Due to the variety and/or quantity of data stored in the storage array (102), any number of entities may be interested in events that occur with respect to the data stored in the storage array (102). Such entities may desire to know when events such as, for example, when particular data is added to the storage array (102), when particular data stored in the storage array (102) is modified, and/or when particular data already stored in the storage array (102) is removed from the storage array (102).

Rather than waiting for the entities that desire to have knowledge regarding events that impact the data of the storage array (102) to poll the storage array (102) to obtain information regarding the particular data, the storage array (102) may proactively send notifications and/or data to the entities as part of providing data storage services. By doing so, the storage array (102) may reduce the computing load placed on a distributed environment in which the storage array (102) exists by reducing the amount of polling of data of the storage array (102) that entities may conduct in an environment in which the storage array (102) does not take proactive action.

For example, the storage array (102) may determine that when a first entity requests a status of a particular portion of data (e.g., an event that impacts the data stored in the storage array) stored in the storage array (102) two other entities may also desire to know the status of the data. In response to this determination, the storage array (102) may send information and/or data to the entities to attempt to proactively address (or more specifically mitigate) likely future polling activity that may occur.

To facilitate the aforementioned data storage services of the storage array (102), the example system (100) may also include a message queue (104). The message queue (104) may manage messages sent between the storage array (102) and entities that may desire information regarding events that impact data stored in the storage array (102). The message queue (104) may include multiple queue for each of the entities that desire information regarding events that impact data stored in the storage array (102).

The system may further include hosts (106). The hosts (106) may desire information regarding events that impact data stored in the storage array (102). For example, the hosts (106) may be tasked with determining that status of particular data stored in the storage array (102). The hosts (106) may provide the information regarding the data stored in the storage array (102) to other entities (not shown) or may use the information themselves for other purposes.

The components of the system illustrated in FIG. 1 may be operably connected to each other and/or operably connected to other entities (not shown) via any combination of wired and/or wireless networks. Each component of the system illustrated in FIG. 1 is discussed below.

The storage array (102) may include one or more computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store data as well as computer instructions, e.g., computer code, that (when executed by the processor(s) of the computing device) cause the computing device to perform the functions described in this application and/or all, or a portion, of the methods illustrated in FIGS. 2.1-3.3. The storage array (102) may be other types of computing devices without departing from the invention. For additional details regarding computing devices, refer to FIG. 5.

In one or more embodiments of the invention, the storage array (102) is a distributed computing device. As used herein, a distributed computing device refers to functionality provided by multiple computing device cooperatively providing one or more functionalities. For example, a distributed computing device may include multiple, separate computing devices that each store data and that are each programmed to perform all, or a part, of the one or more functionalities. In such a scenario, the functionality of the storage array (102) may be performed by multiple, different computing devices without departing from the invention.

To provide the functionality of the storage array (102), any of the computing devices of the storage array (102) may include computer instructions, e.g., computer code, that when executed by one or more processors of the computing devices of the storage array (102) cause the computing devices of the storage to perform the functions described in this application and/or all, or a portion, of the methods illustrated in FIGS. 2.1-3.3.

In one or more embodiments of the invention, all, or a portion, of the computing devices of the storage array (102) include special purpose computing devices. The special purpose computing devices may be, for example, storage controllers, raid controllers, load balancers, and/or any other type of special purpose computing devices for providing data storage services. The special purpose computing devices of the storage array (102) may perform different and/or similar functions. The computing devices of the storage array (102) may, when providing the functionality of the storage array (102), invoke the functionality of the special purpose computing devices.

All or a portion of the storage array (102) may be implemented using one or more logical devices without departing from the invention. For example, the storage array (102) include one or more virtual machine (or multiple virtual machines) that utilizes computing resources of any number of computing devices to provide the functionality of the storage array (102). The storage array (102) may be other types of logical devices without departing from the invention.

As discussed above, the storage array (102) may provide data storage services. Providing data storage services may include (i) storing data, (ii) providing stored data, (iii) identifying events that impact stored data (and/or data to be stored in the future and/or the lack of particular data stored in the storage array (102)), and/or (iv) taking action in response to identifying the events impacting the stored data. By doing so, the storage array (102) may improve the efficiency of a distributed system in which the storage array (102) exists by (i) decreasing the use of network bandwidth for polling operations, (ii) reducing the delay between when data is impacted by events and when entities learn of the impacted data, and/or (iii) reduced utilization of resources of the storage array (102) which, consequently, improves the ability of the storage array (102) to store data and/or provide stored data.

To take action in response to identifying the events impacting the stored data, the storage array (102) may identify entities that are likely to cause polling workloads in the future, related to the events impacting the stored data, and proactively address the likely polling workloads in the future. To proactively address the likely polling workloads in the future, the storage array (102) may send unsolicited data to any number of entities and/or notify the entities of the unsolicited data. Having a copy of the unsolicited data and/or being notified of the unsolicited data may reduce the likelihood that an entity may poll the storage array (102) in the future. For additional details regarding the storage array (102), refer to FIG. 1.2.

The message queue (104) may include computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-3.3. The message queue (104) may include other types of computing devices without departing from the invention. For additional details regarding computing devices, refer to FIG. 5.

In one or more embodiments of the invention, the message queue (104) is a distributed computing device. As used herein, a distributed computing device refers to functionality provided by multiple computing devices cooperatively providing one or more functionalities. For example, a distributed computing device may include multiple, separate computing devices that are each programmed to perform all, or a part, of the one or more functionalities. In such a scenario, the functionality of the message queue (104) may be performed by multiple, different computing devices without departing from the invention.

To provide the functionality of the message queue (104), any of the computing devices of the message queue (104) may include computer instructions, e.g., computer code, that when executed by one or more processors of the computing devices of the message queue (104) cause the computing devices of the storage to perform the functions described in this application and/or all, or a portion, of the methods illustrated in FIGS. 2.1-3.3.

In one or more embodiments of the invention, all, or a portion, of the computing devices of the message queue (104) include special purpose computing devices. The special purpose computing devices may be, for example, high speed cache, high speed memory, and/or any other type of special purpose computing devices for providing message queuing services. The special purpose computing devices of the message queue (104) may perform different and/or similar functions. The computing devices of the message queue (104) may, when providing the functionality of the message queue (104), invoke the functionality of the special purpose computing devices.

The message queue (104) may be a logical device without departing from the invention. For example, the message queue (104) may be a virtual machine (or multiple virtual machines) that utilizes computing resources of any number of computing devices to provide the functionality of the message queue (104). The message queue (104) may be other types of logical devices without departing from the invention.

In one or more embodiments of the invention, the message queue (104) provides message queueing services. Providing message queueing services may include (i) obtaining a message of a type from the storage array (102) and/or the hosts (106), (ii) storing the messages in queues corresponding to the message type in a set of queues associated with a particular host (e.g., 106.2, 106.4), and/or (iii) providing messages from the queues of the message queue (104) to components of the storage array (102) and/or the hosts (106). By doing so, the message queue (104) may managing messaging between the storage array (102) and the hosts (106) to facilitate the data storage services provided by the storage array (102). For additional details regarding the message queue (104), refer to FIGS. 1.2-1.3.

The hosts (106) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-3.3. The hosts (106) may be other types of computing devices without departing from the invention. For additional details regarding computing devices, refer to FIG. 5.

In one or more embodiments of the invention, the hosts (106) are distributed computing devices. As used herein, a distributed computing device refers to functionality provided by multiple computing device cooperatively providing one or more functionalities. For example, a distributed computing device may include multiple, separate computing devices that are each programmed to perform all, or a part, of the one or more functionalities. In such a scenario, the functionality of the hosts (106) may be performed by multiple, different computing devices without departing from the invention.

To provide the functionality of the hosts (106), any of the computing devices of the hosts (106) may include computer instructions, e.g., computer code, that when executed by one or more processors of the computing devices of the hosts (106) cause the computing devices of the storage to perform the functions described in this application and/or all, or a portion, of the methods illustrated in FIGS. 2.1-3.3.

The hosts (106) may be a logical device without departing from the invention. For example, the hosts (106) may be a virtual machine (or multiple virtual machines) that utilizes computing resources of any number of computing devices to provide the functionality of the hosts (106). The hosts (106) may be other types of logical devices without departing from the invention.

In one or more embodiments of the invention, the hosts (106) provides event monitoring services. Providing event monitoring services may include (i) identifying events that may impact data stored in the storage array (102), (ii) polling the storage array (102) regarding the status of the data to determine whether any of the events that have occurred, (iii) notifying other entities when events occur, (iv) listening for notifications from the storage array (102) that may indicate that an event has occurred, (v) obtaining solicited data from the storage array (102) when an event occurs and/or providing the solicited data to other entities and/or providing information regarding the solicited data to other entities, and/or (vi) obtaining unsolicited data from the storage array (102) and/or providing the unsolicited data and/or information regarding the unsolicited data to other entities. By doing so, the hosts (e.g., 106.2, 106.4) may enable other entities to be efficiently notified of relevant information regarding data stored in the storage array (102). For additional details regarding the hosts (106), refer to FIG. 1.3.

While the system of FIG. 1.1 has been described and illustrated as including a limited number of components for the sake of brevity, a system in accordance with embodiments of the invention may include additional, fewer, and/or different components than those illustrated in FIG. 1.1 without departing from the invention. Additionally, while the components of the system of FIG. 1.1 have been illustrated as separate, independent components, the functionality of any of the components of FIG. 1.1 may be combined into a single component without departing from the invention.

For example, the functionality of the message queue (104) and/or the functionality of the hosts (106) may be provided by the storage array (102). Alternatively, the functionality of the hosts (106) may be provided by the message Queue. Etc.

As discussed above, the storage array (102) may utilize the queue services provided by the message queue (104) when providing data storage services. FIG. 1.2 shows a diagram of an example storage array (102.2) and an example message queue (104.4) in accordance with one or more embodiments of the invention. The example storage array (102.2) may be similar to any of the storage array (102, FIG. 1) and the example message queue (104.4) may be similar to the message queue (104, FIG. 1.1).

To provide the aforementioned functionality of the example storage array (102.2), the example storage array (102.2) may include a storage array manager (114) and a persistent storage (116). Each component of the example storage array (102.2) is discussed below.

The storage array manager (114) may provide data storage services, as discussed above. To provide data storage services, the storage array manager (114) may include a request handler (110) and an event handler (112).

The request handler (110) may (i) manage requests from other entities and (ii) identify potential events regarding data stored in the persistent storage (116).

To manage requests from other entities, the request handler (110) may obtain the requests from request queues (e.g., 122) managed by the example message queue (104.4). The requests obtained from the request queues may be, for example, data access requests, data status requests, data modification requests, data addition requests, data removal requests, and/or other types of requests related to data included in the persistent storage (116).

Based on the requests, the request handler (110) may generate responses to the requests. The responses to the requests may be data structures that include information responsive to the requests (e.g., solicited data). The responses to the requests may be based on data included in the persistent storage (116) and/or information regarding data in the persistent storage (116) and/or information regarding a lack of data in the persistent storage (116). The responses may be based on other factors without departing from the invention.

For example, a request may specify that an entity desires to know a status of a particular portion of data stored in the persistent storage (116). To generate a response to the request, the request handler (110) may determine the status of the particular portion of data, generate an in-memory data structure, and populate the in-memory data structure based on the status of the particular portion of data. If the status of the particular portion of data is "unchanged since the last time the status was checked," the in-memory data structure may be populated with the aforementioned status.

The response may include, for example, information regarding the particular portion of data, all (or a portion) of the particular portion of data, access information regarding the particular portion of data, status information regarding the particular portion of data, and/or other any of types of information that may be used to satisfy a request obtained from a request queue (e.g., 122).

After generating responses, the request handler (110) may provide the responses to the requesting entity by adding the response to a response queue (e.g., 124) corresponding to the requesting entity. As will be discussed in greater detail below, the example message queue (104.4) may include sets of queues (e.g., 122, 124, 126, 128) corresponding to each entity that may be interested in information regarding data stored in the persistent storage (116). Consequently, the request handler (110) may responsd to requests obtained from a request queue (e.g., 122) of a particular set of queues (e.g., 122, 124, 126, 128) by adding responses to the requests to the response queue (124) of the particular set of queues from which the corresponding request was obtained.

To identify potential events regarding data stored in the persistent storage (116), the request handler (110) may monitor the requests obtained from the request queues (e.g., 122) of the example message queue (104.4). The request handler (110) may identify the potential events based on the monitoring.

When a potential event is identified, the request handler (110) may notify the event handler (112) of the potential event. By doing so, as will be discussed in greater detail below, embodiments of the invention may proactively address potential future polling workloads by initiating action based potential events.

The event handler (112) may take action when the request handler (110) notifies the event handler (112) of potential events. To take action, the event handler (112) may determine a course of action to perform based on a type of the potential event. Once determined, the event handler (112) may perform the course of action.

The course of action may be, for example, to provide unsolicited data to one or more entities and/or notify one or more entities of unsolicited data. Unsolicited data may be data for which the entities have not requested the data of the unsolicited data and/or have not requested information (e.g., status information) regarding the data of the unsolicited data. The unsolicited data may be data stored in the persistent storage (116) or data that has not been stored in the persistent storage (116).

For example, the unsolicited data may be a portion of the data stored in the persistent storage (116).

In another example, the unsolicited data include information regarding a status of a portion of data stored in the persistent storage (116). The status may be whether the contents of the portion of the data was modified and/or deleted during a period of time (e.g., the period of time from when a status of the portion of data stored in the persistent storage (116) had previously been provided to one or more entities).

In a still further example, the unsolicited data may include information regarding a status of a portion of data not stored in the persistent storage (116). In other words, the information may be that the portion of data has not yet been stored in the persistent storage (116).

The unsolicited data may include other types of information without departing from the invention.

To notify the one or more entities of the unsolicited data, the event handler (112) may generate an event. The event may be an in-memory data structure that includes information regarding the unsolicited data. The information regarding the in-memory data structure may include, for example, an identifier of the unsolicited data, a description of the contents of the unsolicited data, access information for the unsolicited data, and/or other information that may be used by the entities to decide whether to access and/or obtain additional information regarding the unsolicited data.

Additionally, the event handler (112) may add the event to one or more event queues (e.g., 126) corresponding to the one or more entities that the event handler (112) identified as part of the course of action. By doing so, as will be discussed in greater detail below, the one or more entities may be notified of the unsolicited data by being provided with the generated event.

Similarly, the one or more entities may be provided with the unsolicited data either directly or indirectly. If provided with the unsolicited data directly, the event handler (112) may add the unsolicited data to one or more event data queues (e.g., 128) corresponding to the one or more entities. If provided indirectly, the event handler (112) may add information to the event (provided to the one or more entities via the event queues (e.g., 126)) indicating that the one or more entities should retrieve the unsolicited data from the example storage array (102.2).

To provide the above noted functionality of the storage array manager (114), the storage array manager (114) may perform all, or a portion, of the methods illustrated in FIGS. 2.1-3.3. For example, the request handler (110) and/or the event handler (112) of the storage array manager (114) may perform all, or a portion, of the aforementioned methods.

In one or more embodiments of the invention, the storage array manager (114) is a hardware device including circuitry. The storage array manager (114) may be, for example, a digital signal processor, a field programmable gate array, or an application specific integrated circuit. The storage array manager (114) may be other types of hardware devices without departing from the invention.

In one or more embodiments of the invention, the storage array manager (114) is implemented as computing code stored on a persistent storage that when executed by a processor performs the functionality of the storage array manager (114). The processor may be a hardware processor including circuitry such as, for example, a central processing unit or a microcontroller. The processor may be other types of hardware devices for processing digital information without departing from the invention.

In one or more embodiments of the invention, the functionality of the storage array manager (114) is provided by special purpose hardware devices. For example, the storage array manager (114) may be implemented as computing code stored on a persistent storage that when executed by a processor performs the functionality of the storage array manager (114). When executing the computing code stored on the persistent storage, the processor may invoke functionality of one or more special purpose hardware devices that gives rise to a portion of the functionality off the storage array manager (114). The special purpose hardware device may be, for example, a programmable gate array, application specific integrated circuit, digital signal process, or other type of hardware device operably connected to the processor.

In one or more embodiments of the invention, the persistent storage (116) provides data storage resources for the example storage array (102.2) and/or other entities. The data storage resources may enable the example storage array (102.2) to persistently store digital data. The persistent storage (116) may store data structures including (i) information regarding data for which the example storage array (102.2) is providing data storage services, (ii) information that may be used to identify potential events based on requests obtain from request queues (e.g., 122), and (iii) actions to be taken in response to different types of potential events. The persistent storage (116) may store additional, different, and or less information without departing from the invention. The example storage array (102.2) may be a physical storage device or a logical storage device.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

While the example storage array (102.2) of FIG. 1.2 has been described and illustrated as including a limited number of components for the sake of brevity, a storage array in accordance with embodiments of the invention may include additional, fewer, and/or different components than those illustrated in FIG. 1.2 without departing from the invention.

As discussed above, the example message queue (104.4) may provide message queueing services. To provide the aforementioned functionality of the example message queue (104.4), the example message queue (104.4) may include any number of message queue sets (e.g., 120.2, 120.4).

Each of the respective message queue sets (e.g., 120.2) may be associated with a corresponding host. In other words, each of the separate message queue sets (e.g., 120.2) may provide queueing services for a corresponding host. The example message queue (104.4) may include additional message queue sets for providing message queueing services to any number of other entities without departing from the invention.

Each of the respective message queue sets (e.g., 120.2) may include a request queue (122), a response queue (124), an event queue (126), and an event data queue (128). The request queue (122) and the response queue (124) may manage messages between the request handler (110) and a corresponding host. The event queue (126) and the event data queue (128) may manage messages and/or data sent from the event handler (112) to a corresponding host. Each of the queues (e.g., 122, 124, 126, 128) of the message queue sets (120.2, 120.4) is discussed below.

A queue may be (i) a data structure for storing information in a particular order and (ii) management of the data structure that ensures an entity for which the queue exists is provided information from the data structure in a particular order. For example, a queue may be a first in, first out quest; a last in, first out queue, a buffer, or another type of information management entity that temporarily stores information. The information may be temporarily stored to provide an entity for which the queue exists appropriate time for processing the information.

For example, a queue may include a data structure that orders messages received from an entity in an order corresponding to the temporal order in which the messages were received by the queue. Management of the queue may ensure that the entity, for which the queue exists, is provided the messages in the same temporal order but at different point in time from which the messages were received.

To provide for management of the queue, each queue may include an application (e.g., computer code being executed by a processor) that provides for management of the queue in a manner consistent with a type of the queue (e.g., orders messages stored in a data structure in an order consistent with the queue type). However, the queue may not include active components without departing from the invention. For example, the queue may be implemented as a data structure that other entities may read and/or write to. The other entities may be programmed to store message and/or data in an order within the data structure consistent with the queue type. The entity, for which the queue exists, may be programmed to read data from the queue in a manner consistent with the queue type.

The request queue (122) may be a queue for managing requests sent from a corresponding host to the request handler (110). The requests may indicate that the corresponding host desires information regarding a portion of data stored in the persistent storage (116). The requests may indicate that the corresponding host desires any type of information regarding any type and any quantity of data of the persistent storage. The request handler (110) may read messages from the request queue (122) and take appropriate action in response to reading the messages.

The response queue (124) may be a queue for managing responses sent from the request handler (110) to a corresponding host in response to messages that the request handler (110) read from the request queue (122). The responses may include information responsive to the requests that the request handler (110) read from the request queue (122). The responses may include (i) responsive information to a request and/or and (ii) information that enables an entity reading a response to ascertain which particular request the response has been sent in response to the particular request. A host, corresponding to the response queue (124) may read the responses in the response queue (124). For additional details regarding responses and requests, refer to FIG. 1.3.

The event queue (126) may be a queue for managing events sent from the event handler (112) to a corresponding host in response to identifying that an event has occurred. As noted above, the request handler (110) may notify the event handler of the occurrence of events. An event may include information that may enable a host corresponding to the event queue (126) to determine whether to obtain unsolicited data and/or to obtain the unsolicited data. For example, an event may include information regarding the unsolicited data and/or access information for the unsolicited data.

The event handler (112) may send copies of an event to any number of event queues (126). Consequently, any number of hosts (e.g., one host, multiple hosts), corresponding to event queues in which the event handler (112) added an event, may be notified of the occurrence of a particular event. Hosts corresponding to the event queues (e.g., 126) may read the events of the event queues (e.g., 126).

The event data queue (128) may be a queue for managing sending of unsolicited data from the event handler (112) to a corresponding host in response to identifying that an event has occurred. As noted above, the request handler (110) may send unsolicited data in response to the occurrence of events. However, the event data queue (128) may only be able to provide queueing services for unsolicited data of up to a maximum size. If unsolicited data exceeds the maximum size, the unsolicited data may not be provided to a host corresponding to the event data queue (128). Hosts corresponding to the event data queues (e.g., 128) may read the unsolicited data of the event data queues (e.g., 128).

In one or more embodiments of the invention, the message queue sets (e.g., 120.2, 120.4) are hardware devices including circuitry. The message queue sets (e.g., 120.2, 120.4) may be, for example, digital signal processors, field programmable gate arrays, or application specific integrated circuits. The message queue sets (e.g., 120.2, 120.4) may be other types of hardware devices without departing from the invention.

In one or more embodiments of the invention, the message queue sets (e.g., 120.2, 120.4) are implemented as computing code stored on a persistent storage that when executed by a processor performs the functionality of the message queue sets (e.g., 120.2, 120.4). The processor may be a hardware processor including circuitry such as, for example, a central processing unit or a microcontroller. The processor may be other types of hardware devices for processing digital information without departing from the invention.

In one or more embodiments of the invention, the functionality of the message queue sets (e.g., 120.2, 120.4) is provided by special purpose hardware devices. For example, the message queue sets (e.g., 120.2, 120.4) may be implemented as computing code stored on a persistent storage that when executed by a processor performs the functionality of the message queue sets (e.g., 120.2, 120.4). When executing the computing code stored on the persistent storage, the processor may invoke functionality of one or more special purpose hardware devices that gives rise to a portion of the functionality off the message queue sets (e.g., 120.2, 120.4). The special purpose hardware device may be, for example, a programmable gate array, application specific integrated circuit, digital signal process, or other type of hardware device operably connected to the processor.

While the example message queue (104.4) of FIG. 1.2 has been described and illustrated as including a limited number of components for the sake of brevity, a storage array in accordance with embodiments of the invention may include additional, fewer, and/or different components than those illustrated in FIG. 1.2 without departing from the invention.

As discussed above, the example message queue may provide queue services to hosts. FIG. 1.3 shows a diagram of the example message queue (104.4) and example hosts (e.g., 130, 132) in accordance with one or more embodiments of the invention. The example hosts (e.g., 130, 132) may be similar to the hosts (106, FIG. 1).

As discussed with respect to FIG. 1.1, the example hosts (e.g., 130, 132) may provide event monitoring services for other entities (not shown). By doing so, the other entities may be notified of changes, or the lack of changes, to data stored in persistent storage of a host array.

To provide the aforementioned functionality of the example hosts (e.g., 130, 132), each of the example hosts may include an event concerned agent. Each component of the example hosts (e.g., 130, 132) is discussed below.

The event concerned agent (144) may be an entity tasked with monitoring the status of data stored in a storage array. To do so, the event may send and/or receive messages and/or data via the example message queue (104.4).

The event concerned agent (144) may include an agent application programming interface (146) for sending and receiving messages via the request queue (122) and the response queue (124). The agent application programming interface (146) may enable other entities to transmit and receive messages via these queues.

For example, the agent application programming interface (146) may be provided requests from other entities for sending via the request queue (122). In response, the agent application programming interface (146) may generate queue compliant requests for information from the storage array. Similarly, the agent application programming interface (146) may obtain response, to previously sent requests, from the response queue (124). The agent application programming interface (146) may extract relevant information from the responses and provide the extracted information to other entities. The other entities may include, for example, the agent event listener (148). The other entities may include additional entities, other than the agent event listener (148), without departing from the invention.

The event concerned agent (144) may also include an agent event listener (148) that may be an entity tasked with monitoring events and/or data (i.e., unsolicited data) received via the event queue (126) and/or the event data queue (128), respectively. The agent event listener (148) may take action in response to obtaining events and/or data via these queues.

For example, the agent event listener (148) may provide data (i.e., unsolicited data) and/or information regarding data obtained from the event data queue (128) to other entities for which the respective example hosts are providing services (the entities may be, for example, application hosted by other devices that utilize such information as part of their normal operation). Similarly, the agent event listener (148) may provide all, or a portion, of the information included in events obtained from the event queue (126) to other entities for which the respective example hosts are providing services. The agent event listener (148) may also, if warranted, obtain unsolicited information using information included in the events. The agent event listener (148) may provide the data (i.e., the unsolicited data it obtained) and/or information regarding data to other entities for which the respective example hosts are providing services.

In one or more embodiments of the invention, the event concerned agent (144) is a hardware device including circuitry. The event concerned agent (144) may be, for example, a digital signal processor, a field programmable gate array, or an application specific integrated circuit. The event concerned agent (144) may be other types of hardware devices without departing from the invention.

In one or more embodiments of the invention, the event concerned agent (144) is implemented as computing code stored on a persistent storage that when executed by a processor performs the functionality of the event concerned agent (144). The processor may be a hardware processor including circuitry such as, for example, a central processing unit or a microcontroller. The processor may be other types of hardware devices for processing digital information without departing from the invention.

In one or more embodiments of the invention, the functionality of the event concerned agent (144) is provided by special purpose hardware devices. For example, the event concerned agent (144) may be implemented as computing code stored on a persistent storage that when executed by a processor performs the functionality of the event concerned agent (144). When executing the computing code stored on the persistent storage, the processor may invoke functionality of one or more special purpose hardware devices that gives rise to a portion of the functionality off the event concerned agent (144). The special purpose hardware device may be, for example, a programmable gate array, application specific integrated circuit, digital signal process, or other type of hardware device operably connected to the processor.

While the example hosts (e.g., 130, 132) of FIG. 1.3 have been described and illustrated as including a limited number of components for the sake of brevity, a host in accordance with embodiments of the invention may include additional, fewer, and/or different components than those illustrated in FIG. 1.3 without departing from the invention.

Returning to FIG. 1.1, the storage array (102) may provide data storage services to any number of entities. FIGS. 2.1-2.2 illustrate methods that may be performed by the storage array (102) of the system of FIG. 1.1 when providing data storage services.

FIG. 2.1 shows a flowchart of a method in accordance with one or more embodiments of the invention. The method depicted in FIG. 2.1 may be used to respond to a request in accordance with one or more embodiments of the invention. The method shown in FIG. 2.1 may be performed by, for example, a storage array (e.g., 110, FIG. 1). Other components of the system illustrated in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

In step 200, a request, from requesting host, for solicited data is obtained using a request queue corresponding to the requesting host.

In one or more embodiments of the invention, the request for solicited data is obtained by obtaining the next request to be processed as specified by the request queue. For example, the request queue may specify in order for processing multiple requests in the request queue. The request may be the next request of the requests to be processed as specified by the processing order specified by the request queue.

In one or more embodiments of the invention, the solicited data is a portion of data stored in a persistent storage. The storage array may be providing data storage services for the portion of the data. The persistent storage may be managed by the storage array. For example, the persistent storage may be a portion of the storage array and/or maybe remote storage that the storage array manages. The storage array may manage the persistent storage by controlling, using, maintaining, and/or organizing data stored in the persistent storage.

In step 202, the request is responded to based on (or serviced using) the solicited data. The request is also responded to using a response queue corresponding to the requesting host.

The request may be responded to based on the solicited data by obtaining and/or generating responsive information regarding the solicited data. Responsive information may be stored as a response. The response may be added to the response queue corresponding to the requesting host to use the response queue.

For example, consider a scenario in which the solicited data is an entry of a list stored in a persistent storage. The request may query whether the entry of the list has been modified during a predetermined period of time. To generate the responsive information, it may be ascertained whether the list has been modified during the predetermined period of time. The response may be generated by adding the generated responsive data to a data structure, i.e., the response. The response may be added to the response queue to respond to the request using the response queue. Consequently, the host that sent the request via the request queue will receive the response corresponding to the request via the response queue associated with the request queue that the host used when sending the request.

In step 204, is determined whether the request implicates multiple hosts.

The request may implicate multiple hosts when multiple hosts may send similar requests to that obtained in step 200 and the future. The determination may be made via any method without departing from the invention.

If it is determined that the request implicates multiple hosts, the method may proceed to step 206. If it is determined that the request does not implicate multiple hosts, the method may end following step 204.

In step 206, unsolicited data, based on the request, his distributed to the multiple hosts.

As discussed above, the unsolicited data may include the solicited data of step 200 or other data stored in persistent storage. By distributing the unsolicited data to the multiple hosts, it may be less likely that the multiple hosts will send requests similar to that obtained in step 200. Consequently, fewer computing resources may be consumed in the future for generating such requests, sending the requests, processing the requests, and/or responding to the requests when compared to scenarios in which the unsolicited data is not distributed to the multiple hosts.

In one or more embodiments of the invention, the unsolicited data is distributed to the multiple hosts via the method illustrated in FIG. 2.2. Unsolicited data may be distributed to the multiple hosts via other methods without departing from the invention.

The method may end following step 206.

FIG. 2.2 shows a flowchart of a method in accordance with one or more embodiments of the invention. The method depicted in FIG. 2.2 may be used to distribute unsolicited data in accordance with one or more embodiments of the invention. The method shown in FIG. 2.2 may be performed by, for example, a storage array (e.g., 110, FIG. 1). Other components of the system illustrated in FIG. 1.1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

In step 210, a portion of the data of the storage array that is relevant to the request is identified to identify relevant data.

In one or more embodiments of the invention, the identified relevant data is data that, if provided to the multiple hosts, may reduce the likelihood that one or more of the multiple hosts may send requests similar to that obtained in step 200 of FIG. 2.1.

In one or more embodiments of the invention, the portion of the data is the solicited data of step 200 of FIG. 2.1.

In step 212, it is determined whether the relevant data may be sent the multiple hosts via a message queue. As discussed above, data such as the relevant data may be sent via a message queue using an event data queue of a message queue set. However, the event data queue may only be capable of sending data of a predetermined size (i.e., smaller than the predetermined size). To make the determination, the size of the relevant data may be compared to the predetermined size associated with an event data queue which may be used to send the relevant data to multiple hosts.

If it is determined that the relevant data may not be sent to the multiple hosts via the message queue, the method may proceed to step 216. If it is determined that the relevant data may be sent to the multiple hosts via the message queue, the method may proceed to step 214.

In step 214, relevant data is sent to the multiple hosts via message queues associated with each of the multiple hosts.

For example, copies of the relevant data may be added each of the message queues associated with each of the respective multiple hosts.

The method may end following step 214.

Returning to step 212, the method may proceed to step 216 if the relevant data may not be sent to the multiple hosts using message queues.

In step 216, an event that indicates that the relevant data is available is generated.

As discussed above, an event may be a data structure that includes information regarding data for which one or more hosts may request information. By sending the event to the one or more hosts, one or more hosts may be less likely to send requests for information regarding the data.

In step 218, the event is provided to the multiple hosts via a corresponding event queue.

The event may be provided to the multiple hosts via the corresponding event queues by adding copies of the event to each of the respective event queues. By doing so, each of the multiple hosts may be provided with a copy of the event.

As will be discussed in greater detail below, providing the multiple hosts with copies of the event may cause one or more hosts to obtain the relevant data via methods that do not require use of an event data queue.

The method may end following step 218.

While steps 216 and 218 are illustrated as not being performed when the relevant data may be sent to the multiple hosts via the event data queues, the steps may also be performed when the relevant data may be sent to the multiple hosts via the event data queues without departing from the invention. In other words, both an event and relevant data may be sent rather than one or the other as illustrated in FIG. 2.2.

Thus, via the methods illustrated in FIGS. 2.1-2.2, embodiments of the invention may provide a method for providing data storage services that decreases the likelihood of multiple hosts sending multiple duplicative requests to a storage array. By doing so, the use of computational resources within the distributed system may be reduced when compared to providing different types of data storage services.

Returning to FIG. 1.1, the hosts (106) may utilize data storage services provided by a storage array (102). FIGS. 3.1-3.3 illustrate methods that may be performed by the hosts (106) of the system of FIG. 1.1 when utilizing data storage services.

FIG. 3.1 shows a flowchart of a method in accordance with one or more embodiments of the invention. The method depicted in FIG. 3.1 may be used to obtain solicited data in accordance with one or more embodiments of the invention. The method shown in FIG. 3.1 may be performed by, for example, hosts (e.g., 110, FIG. 1). Other components of the system illustrated in FIG. 1.1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, a request for solicited data is sent to a storage array using request queue corresponding to the requesting host.

In one or more embodiments of the invention, the solicited data is a portion of data that the storage array may or may not have stored in persistent storage.

In one or more embodiments of the invention, the request for the solicited data is sent to the storage array using the request queue by adding the request to the request queue.

In one or more embodiments of the invention, the request for solicited data is sent in response to a request from another entity for which the host is providing services. For example, the host may be monitoring data of the storage array at the request of another entity. The host may send a request for solicited data to provide the data monitoring of the storage array for the another entity.

For example, the request may be to determine a status of a portion of data stored in persistent storage of the storage array. By sending a request, the host may obtain information that may be used to satisfy the monitoring requirements of the another entity.

In step 302, a response, from the storage array, that is based on the solicited data is obtained using a response queue corresponding to the requesting host.

As discussed above, there may be a request queue and response queue for each of the hosts. Thus, when a request is sent to the storage array using request queue, a response to the request from the storage array may be received via the response queue corresponding to the request queue. For example, the response queue over which the request of step 300 was sent may be part of a message queue set that also includes the response queue.

In one or more embodiments of the invention, the response is obtained by obtaining the next to be processed response from the response queue.

In one or more embodiments of the invention, the response is based on the solicited data because the storage array generated the response based on the request for the solicited data.

In step 304, unsolicited data, that is relevant to the request, is obtained from the storage array.

In one or more embodiments of the invention, the unsolicited data is obtained via one of the methods illustrated in FIGS. 3.2-3.3. Either method may be used depending upon whether an event and/or the unsolicited data is received from the storage array via an event queue and/or an event data queue. For example, as described with respect to FIG. 2.2, an event data queue may be unable to send some types of data due to the size of the data. Consequently, one of the methods illustrated in FIGS. 3.2-3.3 may be used to obtain the unsolicited data depending on the size of the data included in the unsolicited data.

In one or more embodiments of the invention, the unsolicited data includes information that is relevant to monitoring of data being performed by the host. Receiving the information included in the unsolicited data may cause the host to not send a request to the storage array at a future point in time. Thus, the host, by obtaining the information included in the unsolicited data, may be less likely to consume computing resources of the distributed system of FIG. 1.1 in the future.

The method may end following step 304.

FIG. 3.2 shows a flowchart of a method in accordance with one or more embodiments of the invention. The method depicted in FIG. 3.2 may be used to obtain unsolicited data using an event data queue in accordance with one or more embodiments of the invention. The method shown in FIG. 3.2 may be performed by, for example, hosts (e.g., 110, FIG. 1). Other components of the system illustrated in FIG. 1.1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, the unsolicited data is received from the storage array. Unsolicited data may include relevant data, as discussed with respect to step 304 of FIG. 3.1.

In one or more embodiments of the invention, the unsolicited data is received via an event data queue associated with the host. Any number (0, 1, many) of other hosts may also obtain copies of the unsolicited via other event data queues corresponding to the other hosts. For example, as described with respect to step 206 of FIG. 2.1, the unsolicited data may be distributed to multiple hosts.

The method may end following Step 310.

FIG. 3.3 shows a flowchart of a method in accordance with one or more embodiments of the invention. The method depicted in FIG. 3.3 may be used to obtain unsolicited data without using an event data queue in accordance with one or more embodiments of the invention. The method shown in FIG. 3.3 may be performed by, for example, hosts (e.g., 106, FIG. 1). Other components of the system illustrated in FIG. 1.1 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 320, an event is received, using an event queue, that indicates that the unsolicited data is available in the storage array. For example, the event may include a description of the unsolicited data, an identifier of the unsolicited data, and/or access information for the unsolicited data.

In step 322, a request queue is used to send a request for the unsolicited data.

In one or more embodiments of the invention, the request queue is used to send the request for the unsolicited data by generating the request and adding the request to the request queue. The generated request may indicate that a copy of the unsolicited data is to be provided to the host.

In step 324, the unsolicited data is received from the storage array.

In one or more embodiments of the invention, the unsolicited data is received via a response queue associated with the host. For example, the storage array may obtain the request of step 322 and add the unsolicited data to the response queue in response to the request. As the host processes the response queue, the unsolicited data may be received.

The method may end following step 324.

Thus, via the method illustrated in FIGS. 3.1-3.3, embodiments of the invention may provide a method for making requests to a storage array that makes it less likely that future, duplicative requests will be received by the storage array and/or sent by the hosts. For example, receiving unsolicited data in response to such requests may proactively address potential future requests and make it less likely that such requests may be sent in the future.

To further clarify embodiments of the invention, a non-limiting example is provided in FIGS. 4.1-4.6. Each of these figures may illustrate a similar system and/or data used by a similar system to that illustrated in FIG. 1.1 at different points in times. For the sake of brevity, only a limited number of components of the system of FIG. 1.1 are illustrated in each of FIGS. 4.1-4.6.

Example

Consider a scenario as illustrated in FIG. 4.1 in which a storage array (400) is providing data storage services for a first host (404), a second host (406), and a third host (408). The storage array (400) may store a database for which each of the hosts are tasked with monitoring. Each of the hosts (404, 406, 408) are interested in ascertaining when changes to the database are made.

A message queue (402) is providing queueing services for the storage array (400) and the hosts (404, 406, 408). To do so, the message queue (402) includes a first queue set (410) for the first host (404), a second queue set (420) for the second host (406), and a third queue set (430) for the third host (408).

Each of the queue sets are similar to the message queue set A (120.2, FIG. 1.2). However, only a limited number of each of the queues of the queue sets are illustrated for brevity. Each of the queue sets includes a request queue (412) abbreviated as "ReqQ", a response queue (414) abbreviated as "RsqQ" (416), an event queue (not shown), and an event data queue (416) abbreviated as "EDQ".

At a first point in time, prompted by its required monitoring of data of the storage array (400), the first host (404) sends a request (440) to the message queue (402). The request (440) asks for a status of the database stored in the storage array (400).

In response to receiving the request (440), the message queue (402) stores the request (440) in the request queue (412). Over time the storage array (400) processes various requests stored in the request queue (412) until the request (440) reaches the top of the request queue (412). Once the request (440) reaches the top of the request queue (412), the storage array (400) obtains the request (440) as illustrated in FIG. 4.2.

In response to receiving the request (440), the storage array (400) determines that the database has been changed. Additionally, the storage array (400) determines that the change to the database may be an event which the second host (406) and the third host (408) may be interested in obtaining information.

In response to these determinations, the storage array (400) generates response (442) and sends a response to the message queue (402) as illustrated in FIG. 4.3. The response (442) indicates that the database has been changed.

Upon receiving the response (442), the message queue (402) stores the response (442) in response queue (414). The response (442) is stored in the response queue (414) because the response queue (414) is associated with the first host (404), e.g., the sender of the request (440).

Over time, the first host processes responses in the response queue (414) until the response (442) is the next to be processed response in response queue (414). The first host (404) may then request the next response in the response queue (414) resulting in response (442) being sent to the first host (404) as illustrated in FIG. 4.4.

In response to receiving the response (442), the first host (404) is able to notify an interested entity of the change to the database that has occurred.

At a second point in time (which may be the same as the first point in time, these actions of the storage array (400) may be performed in parallel and/or partially concurrently), the storage array (400), in response to determining that the request (440) is an event, prepares and sends copies of unsolicited data (444) to the message queue (402) as illustrated in FIG. 4.5. The unsolicited data (444) includes a changed database entry that caused the status of the database to be changed.

In response to receiving the copies of the unsolicited data (444), the message queue (402) stores the copies of the unsolicited data (444) in respective event data queues (416) of each of the queue sets (410, 420, 430).

As each of the hosts (404, 406, 408) process the respective event data queues (416), the copies of the unsolicited data (444) in each of the event data queues (416) eventually reach the top of each of the queues. After reaching the top of the queues, the unsolicited data (444) in each of the respective queues are provided to the respective hosts (404, 406, 408) as illustrated in FIG. 4.6.

Once received by each of the respective hosts (404, 406, 408), the respective hosts may process unsolicited data (444). By doing so, each of the respective hosts (404, 406, 408) may be less likely to send similar requests that of the request (440) sent by the first host (404).

End of Example

Any of the components of FIG. 1.1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a method for performing data storage services in a distributed environment. The data storage services may include responding to requests to entities regarding the status of data. When responding to a request for the status of data, a system in accordance with one or more embodiments of the invention may send unsolicited data to any number of entities that may or may not have sent the request regarding the status of the data. By doing so, embodiments of the invention may reduce the consumption of computing resources of the distributed system for identifying the status of data.

For example, by sending the unsolicited data, a system in accordance with embodiments of the invention may proactively address questions regarding the status of data that any number of entities of the distributed system may have with regards to data within the distributed system. Consequently, the entities of the system may be less likely to send duplicative requests for the status of the same data. By doing so, computing resource use of the distributed for determining the status of data may be reduced.

Thus, embodiments of the invention may address the problem of the limited availability of computational resources in a distributed system. Specifically, embodiments of the invention may provide a method of responding to status requests of data in a manner that makes it less likely that additional, similar requests will be issued in the future.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage array for providing data storage services, comprising:
   persistent storage for storing data; and
   a storage array manager programmed to:
      obtain a request for solicited data using a request queue corresponding to a requesting host;
      respond, based on the solicited data, to the request using a response queue corresponding to the requesting host;
      make a determination that the request implicates multiple hosts; and
      in response to the determination:
         identify a portion of the data, for which the storage array provides the data storage services and is unsolicited data, that is relevant to the request to identify relevant data;
         make a second determination that the relevant data can be sent to the multiple hosts via event data queues associated with the multiple hosts; and
         provide the relevant data to the multiple hosts using the event data queues associated with the multiple hosts in response to the second determination.

2. The storage array of claim 1, wherein the storage array manager is further programmed to:
   obtain a second request for solicited data using the request queue corresponding to the requesting host;
   respond, based on the solicited data, to the second request using the response queue corresponding to the requesting host;
   make a third determination that the second request implicates multiple hosts; and
   in response to the third determination:
      identify second a portion of the data, for which the storage array provides the data storage services, that is relevant to the request to identify second relevant data;
      make a fourth determination that the second relevant data cannot be sent to the multiple hosts via the event data queues associated with the multiple hosts; and
      in response to the fourth determination:
         generate an event that indicates that the second relevant data is available; and
         provide the event to the multiple hosts via corresponding event queues.

3. The storage array of claim 2, wherein the storage array manager is further programmed to:
   obtain, using request queues corresponding to the multiple hosts, requests for the second relevant data; and
   provide the second relevant data to the multiple hosts without using the event data queues.

4. The storage array of claim 1, wherein the request implicates the multiple hosts when the request is associated with a portion of the data that is relevant to the multiple hosts.

5. The storage array of claim 1, wherein the solicited data is not provided to the requesting host when the storage array manager responds, based on the solicited data, to the request using the response queue corresponding to the requesting host.

6. The storage array of claim 5, wherein the unsolicited data comprises the solicited data.

7. The storage array of claim 1, wherein the multiple hosts comprises the requesting host.

8. The storage array of claim 1, wherein the solicited data is provided to the requesting host when the storage array manager responds, based on the solicited data, to the request using the response queue corresponding to the requesting host.

9. The storage array of claim 1, wherein the multiple hosts do not include the requesting host.

10. A method for providing data storage services, comprising:
   obtaining a request for solicited data using a request queue corresponding to a requesting host;
   responding, based on the solicited data, to the request using a response queue corresponding to the requesting host;
   making a determination that the request implicates multiple hosts; and in response to the determination:
  identifying a portion of the data, for which a storage array provides the data storage services and is unsolicited data, that is relevant to the request to identify relevant data;
  making a second determination that the relevant data can be sent to the multiple hosts via event data queues associated with the multiple hosts; and
  providing the relevant data to the multiple hosts using the event data queues associated with the multiple hosts in response to the second determination.

11. The method of claim 10, further comprising:
obtaining a second request for solicited data using the request queue corresponding to the requesting host;
responding based on the solicited data, to the second request using the response queue corresponding to the requesting host;
making a third determination that the second request implicates multiple hosts; and
in response to the third determination:
  identifying a second portion of the data, for which the storage array provides the data storage services, that is relevant to the request to identify second relevant data;
  making a fourth determination that the second relevant data cannot be sent to the multiple hosts via the event data queues associated with the multiple hosts; and
  in response to the fourth determination:
    generating an event that indicates that the second relevant data is available; and
    providing the event to the multiple hosts via corresponding event queues.

12. The method of claim 11, further comprising:
obtaining, using request queues corresponding to the multiple hosts, requests for the relevant data; and
providing the second relevant data to the multiple hosts without using the event data queues.

13. The method of claim 10, wherein the request implicates the multiple hosts when the request is associated with a portion of the data that is relevant to the multiple hosts.

14. A non-transitory computer readable medium comprising computer readable program code, which when executed by a computer processor enables the computer processor to perform a method for providing data storage services, the method comprising:
obtaining a request for solicited data using a request queue corresponding to a requesting host;
responding, based on the solicited data, to the request using a response queue corresponding to the requesting host;
making a determination that the request implicates multiple hosts; and
in response to the determination:
  identifying a portion of the data, for which a storage array provides the data storage services and is unsolicited data, that is relevant to the request to identify relevant data;
  making a second determination that the relevant data can be sent to the multiple hosts via event data queues associated with the multiple hosts; and
  providing the relevant data to the multiple hosts using the event data queues associated with the multiple hosts in response to the second determination.

15. The non-transitory computer readable medium of claim 14, wherein the method further comprises:
obtaining a second request for solicited data using the request queue corresponding to the requesting host;
responding, based on the solicited data, to the second request using the response queue corresponding to the requesting host;
making a third determination that the second request implicates multiple hosts; and
in response to the third determination:
  identifying a second portion of the data, for which the storage array provides the data storage services, that is relevant to the request to identify second relevant data;
  making a fourth determination that the second relevant data cannot be sent to the multiple hosts via the event data queues associated with the multiple hosts; and
  in response to the fourth determination:
    generating an event that indicates that the second relevant data is available; and
    providing the event to the multiple hosts via corresponding event queues.

16. The non-transitory computer readable medium of claim 15, wherein the method further comprises:
obtaining, using request queues corresponding to the multiple hosts, requests for the relevant data; and
providing the second relevant data to the multiple hosts without using the event data queues.

17. The non-transitory computer readable medium of claim 14, wherein the request implicates the multiple hosts when the request is associated with a portion of the data that is relevant to the multiple hosts.

18. The storage array of claim 1, wherein providing the relevant data to the multiple hosts reduces a likelihood that any of the multiple hosts will request the portion of the data in the future.

19. The method of claim 10, wherein providing the relevant data to the multiple hosts reduces a likelihood that any of the multiple hosts will request the portion of the data in the future.

20. The non-transitory computer readable medium of claim 14, wherein providing the relevant data to the multiple hosts reduces a likelihood that any of the multiple hosts will request the portion of the data in the future.

* * * * *